(12) United States Patent
Ouchi

(10) Patent No.: US 8,788,469 B2
(45) Date of Patent: Jul. 22, 2014

(54) SYSTEMS AND METHODS FOR ORGANIZING AND VALIDATING DATA IN DOCUMENTS

(75) Inventor: Norman Ken Ouchi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1369 days.

(21) Appl. No.: 11/245,717

(22) Filed: Oct. 8, 2005

(65) Prior Publication Data

US 2006/0047676 A1    Mar. 2, 2006

Related U.S. Application Data

(63) Continuation of application No. 10/037,544, filed on Dec. 21, 2001, now Pat. No. 6,954,766.

(51) Int. Cl.
*G06F 7/00* (2006.01)

(52) U.S. Cl.
USPC .......................................... 707/694; 707/740

(58) Field of Classification Search
CPC ............ G06F 17/3023; G06F 17/2705; G06F 17/2725; G06F 17/2276; G06F 17/2735; G06Q 10/087; G06Q 10/06311; G06Q 10/06315; G06Q 10/0639; G06Q 10/06395; G06Q 30/02; G06Q 30/0613
USPC ............... 707/100–102, 104.1, 694–695, 740
See application file for complete search history.

(56) References Cited

U.S. PATENT DOCUMENTS

| | | | | |
|---|---|---|---|---|
| 5,317,729 A | * | 5/1994 | Mukherjee et al. | ............... 707/3 |
| 5,418,957 A | * | 5/1995 | Narayan | ....................... 717/113 |
| 5,857,205 A | * | 1/1999 | Roth | ............................. 707/203 |
| 5,878,408 A | * | 3/1999 | Van Huben et al. | ............... 707/1 |
| 5,920,846 A | | 7/1999 | Storch et al. | |
| 5,926,816 A | * | 7/1999 | Bauer et al. | ....................... 707/8 |
| 6,026,388 A | | 2/2000 | Liddy et al. | |
| 6,094,654 A | * | 7/2000 | Van Huben et al. | ............... 707/8 |
| 6,263,348 B1 | | 7/2001 | Kathrow et al. | |
| 6,460,051 B1 | | 10/2002 | LaRue et al. | |

(Continued)

FOREIGN PATENT DOCUMENTS

JP        04-266138        9/1992

*Primary Examiner* — James Trujillo
*Assistant Examiner* — Linh Black

(57) ABSTRACT

The invention relates to information exchange when a design organization sends a design document to a manufacturer. The design documents may have errors and, once detected, the errors may not be corrected by the design organization. The documents may be resent with a small number of changes or perhaps no changes at all, but may have errors that have been seen before. The documents may have many items that are not important to the receiving organization. A dictionary is used to validate and correct the documents. Changes in the dictionary may require changes in the information used by the manufacturer. The invention provides a system and method for use with a computer that aids in the validation and correction of the information contained in the document, in that it detect changes in the document when resent so that the changes are validated or corrected, filters the document so that only relevant information is processed, detects changes in the dictionary so that only changes are processed, and filters the dictionary so that only relevant information in the dictionary is processed. In addition, the invention provides means to initialize the information that are in use and assumed to be valid to avoid the validation and correction of the information.

24 Claims, 6 Drawing Sheets

(56) References Cited

U.S. PATENT DOCUMENTS

| | | |
|---|---|---|
| 6,477,545 B1 | 11/2002 | LaRue |
| 6,487,560 B1 | 11/2002 | LaRue et al. |
| 6,516,337 B1 * | 2/2003 | Tripp et al. ............ 709/202 |
| 6,633,875 B2 | 10/2003 | Brady |
| 6,850,900 B1 * | 2/2005 | Hare et al. ............ 705/26 |
| 7,188,075 B1 * | 3/2007 | Smirnov ............ 705/10 |
| 2003/0033179 A1 * | 2/2003 | Katz et al. ............ 705/7 |
| 2003/0036968 A1 | 2/2003 | Ouchi |

* cited by examiner

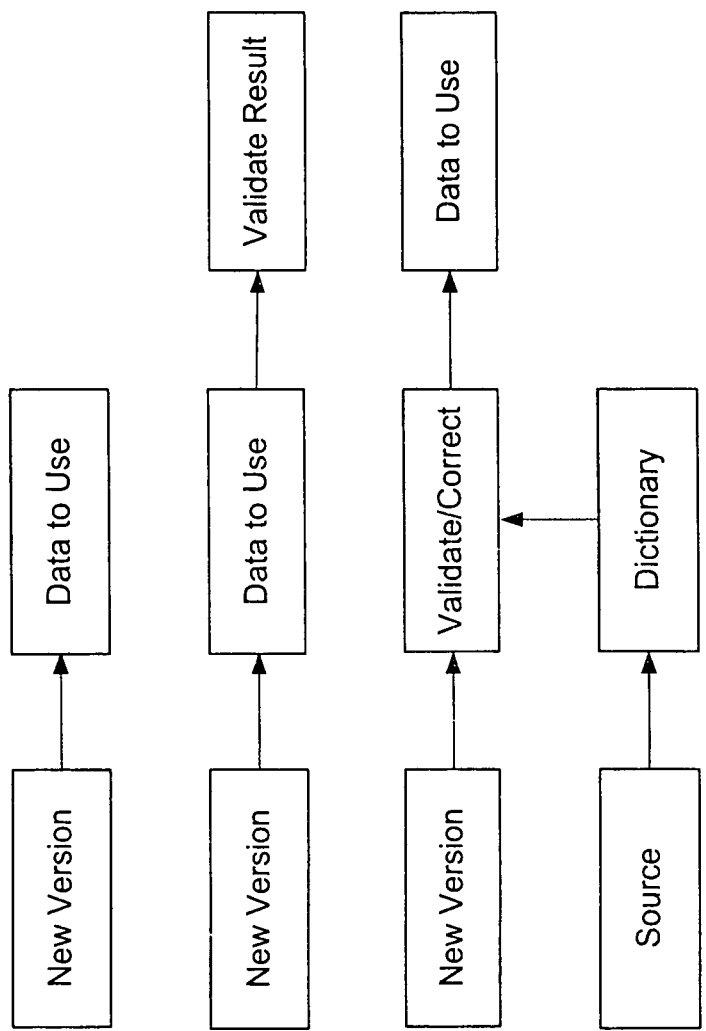

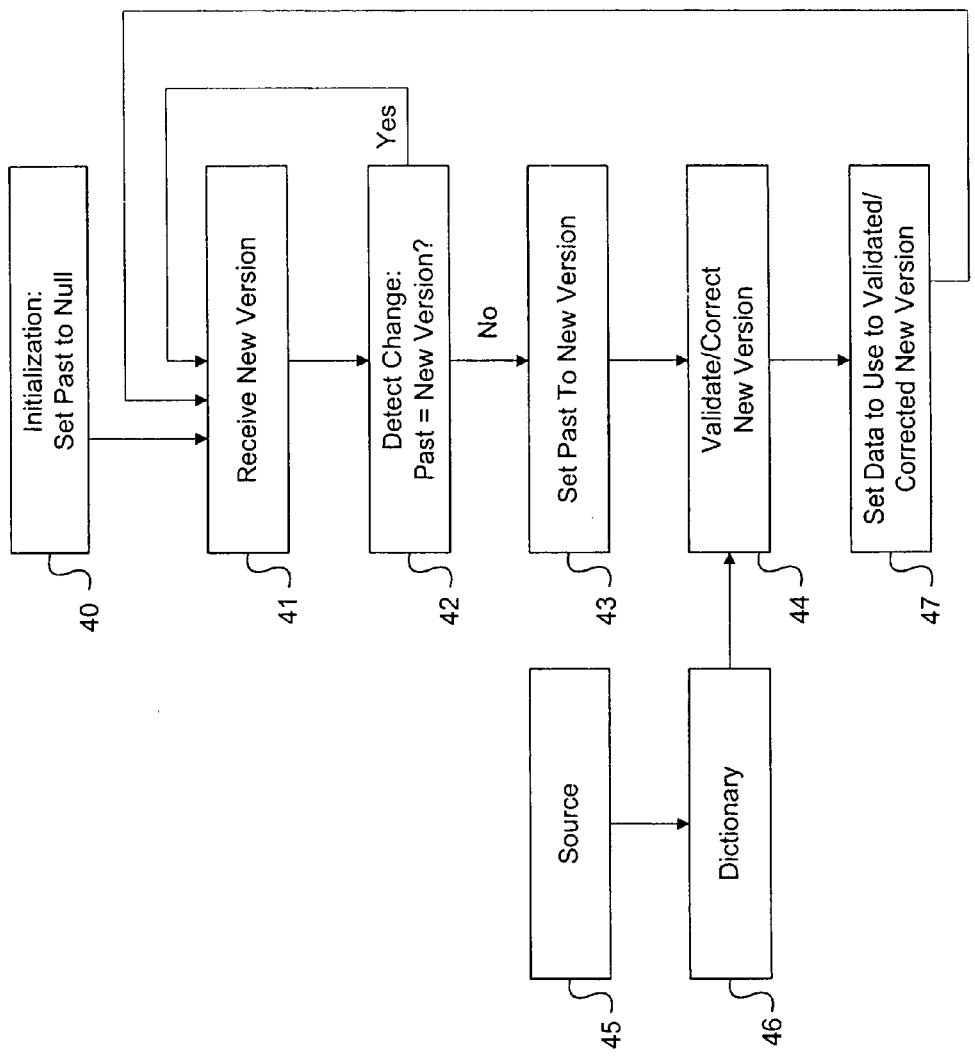

SYSTEMS AND METHODS FOR ORGANIZING AND VALIDATING DATA IN DOCUMENTS

This is a continuation of U.S. application Ser. No. 10/037,544, filed on Dec. 21, 2001, now U.S. Pat. No. 6,954,766 B2, which is incorporated by reference herein. The invention relates to systems and methods to organize and validate data contained in documents transmitted over computer networks, and in particular computer implemented systems and methods to organize and validate data contained in design documents used to manufacture products.

BACKGROUND

Design organizations have increased profit margins by focusing on their core competencies of design and development of products and outsourcing manufacturing. Contract manufacturers can be more cost effective because of manufacturing expertise, flexibility, infrastructure, scalability, and global locations. However, to be more cost effective design organizations and contract manufacturers must reliably exchange the information needed to manufacture the products. Computers, the Internet and TCP/IP protocols, the Web, relational databases, mass storage systems, and enterprise software provide infrastructure for information exchange, but problems still persist.

Design organizations transmit several types of design documents to the contract manufacturer. One type of design document is the bill of materials, abbreviated BOM, which lists the parts and materials needed to assemble a product. Another type is the approved manufacturing list (AML), which also lists the approved part and material suppliers.

Maintaining the integrity of the BOM and the AML over the product life cycle is difficult, because the cycle can last several years and costs drive the design organization to change the data in its AML many times. Also, high tech products typically have many parts, thus the BOM may list several thousand parts and the AML 2-3 times more. Some design organizations make this even less manageable by maintaining a single list for all product offerings resulting in AMLs of, e.g., 50,000 to 100,000 parts. Thus, an AML typically lists many part and material suppliers, each which can change offerings, numbering, and prices of parts during the product life cycle.

Contract manufacturers can manually check the data contained in the BOM and AML against data provided by reputable sources to catch errors before parts are ordered. For example, checking the parts against a part supplier's catalog can detect error before the part is ordered. This may be adequate when the number of part numbers in the BOM and AML are small and there is sufficient time to carefully check. Also, workers can detect and correct errors or interpret the intent of the document without the need to change the original document. However, even conscientious workers may commit errors when comparing lengthy lists of parts identified by alphanumeric codes, and it is expensive to check the parts by functional descriptions.

Although manual processing is fault tolerant, many design documents are now transmitted over the Internet and might be input to computers. However, computers do not have the fault tolerance of humans, and small errors can propagate, amplify, and create large problems. Some documents are incomplete when transmitted and only completed when received. The documents may be also transmitted each time the document changes even when most of the document has not changed or transmitted on a periodic basis even when no changes were made. Care must be taken not to overlay the additional information or corrections that may have been made based on the earlier transmissions of the documents.

As a result, many organizations check the prototype to ensure everything is correct in the BOM and AML. Errors found in the prototype are used to correct the data used to purchase the parts and assemble the product. In some cases the original document is corrected but in others only the data used by the contract manufacturer is corrected. However, the contract manufacturer cannot assume that if the prototype works, the BOM or AML is correct. The fact is the prototype only passed certain tests, which may be inadequate to catch all errors, and catching them later may delay product introduction, particularly, if the product is complex, and involves parts with long lead times. Worse, the lack of integrity in the BOM and/or AML may not be discovered until after the product goes into mass production, resulting in recalls. Because of these problems, contract manufacturers must maintain the integrity of the BOM and AML.

FIG. 1A illustrates a contract manufacturer that receives a new version of a design document and simply uses the data to produce the product. This is rarely acceptable, because errors in the documents may result in a defective product that goes into mass production.

FIG. 1B illustrates a contract manufacturer that receives a new version of the design document, uses the data without checking its integrity, but checks the prototype for errors produced as a result of errors in the new version. This will help find errors before mass production, but is labor intensive and error prone.

FIG. 1C illustrates a contract manufacturer that receives a new version of the design document, and manually validates and corrects the data in the design document before using it. A dictionary of correct data is used for validation and correction of the design document. However, manual validation is labor intensive and error prone over the product life cycle, and errors found in one version of a design document may reappear in subsequent versions of the document.

The BOM and the AML are now described in more detail. Each part listed in the BOM and AML should have a unique part number for identification so similar but different parts are distinguishable and to facilitate automated processing by creating systematic naming of the parts independent of part characteristics.

Below is a simplified example of a BOM:

| Part Number | Quantity | Description |
| --- | --- | --- |
| 123 | 1 | electronic product |
| 456 | 5 | 1-kiloohm resistor |
| 789 | 3 | 1-microfarad capacitor |
| 567 | 1 | printed circuit board (PCB) |
| 678 | 1 | application specific integrated circuit (ASIC) |

As shown above, the BOM of the electronic product 123 lists five 1-kiloohm resistors, three 1-microfarad capacitors, a PCB, and an ASIC. Assembly instructions and drawings describe how the electronic product will be assembled.

The second document is the AML, which lists all of the parts with their approved suppliers:

Below is a simplified example of the AML:

| Part Number | Quantity | Description | Supplier | Supplier Part Number |
|---|---|---|---|---|
| 123 | 1 | electronic product | | |
| 456 | 5 | 1-kiloohm resistor | Acme | 234 |
| 789 | 3 | 1-microfarad capacitor | Acme | 345 |
| " | 3 | 1-microfarad capacitor | Smith | 467 |
| 567 | 1 | PCB | Jones | |
| 678 | 1 | ASIC | Adams | |

The AML lists the approved resistor is the Acme 234, the approved 1-microfarad capacitors are either the Acme 345 and the Smith 467, Jones supplies the PCB 567, and Adams the ASIC 678. Because the PCB and ASIC are custom manufactured, they do not have a supplier part number. The symbol " below part number 789 indicates there are alternative sources of the capacitor. Once the design organization selects its parts from the approved suppliers, the contract manufacturer can assign its own part numbers so the parts can be ordered again.

Now assume the design organization introduces an error in the AML:

| Part Number | Quantity | Description | Supplier Part Number |
|---|---|---|---|
| 123 | 1 | electronic product | |
| 456 | 5 | 1-kiloohm resistor | Acme 239 |
| 789 | 3 | 1-microfarad capacitor | Acme 345 |
| " | 3 | 1-microfarad capacitor | Smith 467 |
| 567 | 1 | PCB | Jones |
| 678 | 1 | ASIC | Adams |

Assuming that the first AML is correct, the error is that the resistor is misidentified as part number 239. If undetected, the contract manufacturer will order the wrong resistor. A worker may detect the error by noting Acme part number 239 is not a 1-kiloohm resistor, but this is not a reliable way to correct the error.

The added part numbers for the PCB and ASIC must be protected from being overlaid (e.g., overwritten) when the design organization sends a new version of the AML to add, change, or remove parts in the AML. For example, the design organization may remove the Smith capacitor because it costs more than the Acme capacitor producing an AML as follows:

| Part Number | Quantity | Description | Supplier Part Number |
|---|---|---|---|
| 123 | 1 | electronic product | |
| 456 | 5 | 1-kiloohm resistor | Acme 239 |
| 789 | 3 | 1-microfarad capacitor | Acme 345 |
| 567 | 1 | PCB | Jones |
| 678 | 1 | ASIC | Adams |

Because the contract manufacturer did not protect the correction of the misidentified resistor part number in this example, the incorrect resistor part number 239 reenters the AML when the design organization sent the new version of the AML. This illustrates some of the reasons there is a need to shift the work of comparing, updating, filtering the data found in design documents from workers to computers.

SUMMARY OF THE INVENTION

The invention relates to the integrity of information exchanged on computer networks. For example, the invention relates to when an organization sends documents to another organization for manufacturing, the documents may have errors and, once detected, the errors may not be corrected in the sending organization's documents. The documents may be resent with a small changes or perhaps no changes at all, but may have errors that have been seen before. The documents may have data that is irrelevant to the receiving organization. The invention provides for filtering of irrelevant data. A dictionary is used to validate and correct the documents. Changes and filtering of the dictionary may also occur to prepare the information used by the receiving organization for processing.

The invention provides a system and method for use with a computer that aids in the validation and correction of information in a document, in that it detect changes in the document when resent so that the changes are validated or corrected, can filter the document so that only relevant items are processed, detects changes in the dictionary so that only changes are processed, and filters the dictionary so that only relevant data in the dictionary is processed. In addition, the invention initializes information in tables that are in use and assumed to be valid to avoid unnecessary validation and correction.

BRIEF DESCRIPTION OF THE DRAWINGS

FIGS. 1A-1C illustrate some ways contract manufacturers use the information contained in design documents to manufacture products.

FIG. 4 is a flowchart of the software program depicted in the block diagram of FIG. 2A.

DETAILED DESCRIPTION OF THE PREFERRED EMBODIMENTS

The invention relates to the integrity of information exchanged over computer networks. One example is where a design organization creates documents that are sent over the Internet to a manufacturing organization to be used to manufacture a product.

Background for suitable computer networks, e.g., the Internet, to use in conjunction with the invention are discussed in Tannebaum, *Computer Networks*, third edition (1996), and Stevens, *TCP/IP Illustrated, Volume* 1 (1994), which are hereby incorporated by reference. Background for suitable database and application server architecture to use in conjunction with the invention is discussed in Loney and Koch, *Oracle 8i: The Complete Reference* (2000), Greenwald et al., *Oracle Essentials: Oracle 9i, Oracle 8i & Oracle 8* (2001), and Kyte, *Expert One-On-One Oracle* (2001), which are hereby incorporated by reference.

The information exchanged is preferably stored in tables in relational database(s) running on a suitable operating system, such as WINDOWS, UNIX, LINUX running on one or more (e.g., a cluster) compatible computer(s) using Intel, AMD, and/or Sun processors.

Table 1 represents an AML to manufacture a product. A typical AML will list more parts, but it is not necessary to expand this AML to understand this aspect of the invention. Each column heading in Table 1 describes the data found in that column and each unique set of data has Its own row. For example, the first row consists of the design organization's part number 458, a 1-kiloohm resistor, supplied by Acme as part number 234. A change in the description, the part supplier, or supplier part number is considered to be a change on the row.

TABLE 1

Example AML

| Part Number | Description | Supplier | Supplier Part Number |
|---|---|---|---|
| 456 | 1-kiloohm resistor | Acme | 234 |
| 789 | 1-microfarad capacitor | Acme | 345 |
| " | 1-microfarad capacitor | Smith | 467 |
| 567 | PCB | Jones | |
| 678 | ASIC | Adams | |

The Change Detection Function

Figure 2A:
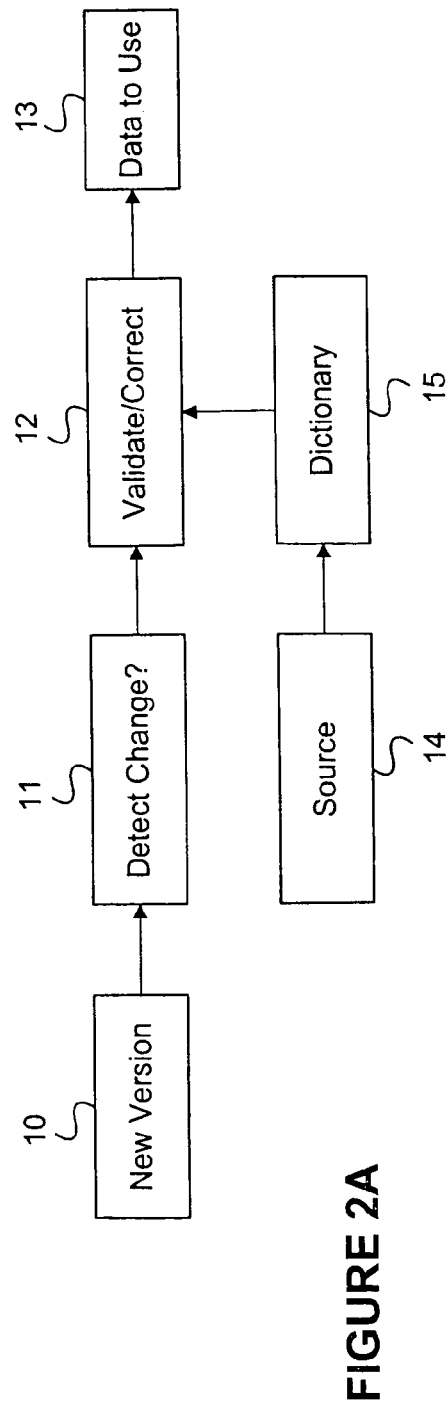
FIG. 2A illustrates a system, including a change detection function, for organizing and validating data contained in design documents transmitted from a design organization to a manufacturing organization.

FIG. 2A shows one flow path of the present invention, which includes the change detection function. The contract manufacturer can implement this in software with the ORACLE 9IAS application server and ORACLE 9I database, and will store two versions of Table 1 In the database. The first version named table Past contains the most recent AML sent by the design organization, and the second version named table Data to Use contains the validated or corrected data for the contract manufacturer to use to make the product. For example, the application server and relational database receive and store a new version of the design document 10 and compare the new version with the past version to detect change 11. If there is no change, the flow path ends. If there Is a change, the software sets the past version to the new version, then validates and corrects data 12 based on a reliable source 14 of a dictionary 15, resulting in data to use 13 to manufacture the product.

Referring to step 40 of FIG. 4, the software program initializes the table Past and the table Data to Use to null values. Null represents the lack of a value. At step 41, the contract manufacturer receives Table 2—New Version from the design organization, which misidentifies Acme resistor part number as 239 rather than 234.

TABLE 2

New Version

| Part Number | Description | Supplier | Supplier Part Number |
|---|---|---|---|
| 456 | 1-kiloohm resistor | Acme | 239 |
| 789 | 1-microfarad capacitor | Acme | 345 |
| 789 | 1-microfarad capacitor | Smith | 467 |
| 567 | PCB | Jones | |
| 678 | ASIC | Adams | |

At step 42, the program compares Table 2—New Version to the table Past to detect if there is any change. Because the initialization step set all the data in table Past to null values, none of the data in the Table 2—New Version matches the data in the table Past. Accordingly, at step 43, the table Past is set to the table New Version as shown as Table 3—Past below.

TABLE 3

Past

| Part Number | Description | Supplier | Supplier Part Number |
|---|---|---|---|
| 456 | 1-kiloohm resistor | Acme | 239 |
| 789 | 1-microfarad capacitor | Acme | 345 |
| 789 | 1-microfarad capacitor | Smith | 467 |
| 567 | PCB | Jones | |
| 678 | ASIC | Adams | |

At step 44, the data is validated and corrected, including the resistor part numbering error, using a source 45 of a reliable dictionary 46, which may be stored in, among other things, a catalog, CD, Web site, or other data storage system. At step 47, Table 4—Data to Use is set to the table Validated/Corrected New Version.

TABLE 4

Data to Use

| Part Number | Description | Supplier | Supplier Part Number |
|---|---|---|---|
| 456 | 1-kiloohm resistor | Acme | 234 |
| 789 | 1-microfarad capacitor | Acme | 345 |
| 789 | 1-microfarad capacitor | Smith | 467 |
| 567 | PCB | Jones | |
| 678 | ASIC | Adams | |

Table 4—Data to Use, however, still needs the supplier part numbers for the PCB and ASIC. Thus, the contract manufacturer transmits the specification of the PCB to Jones, which informs the part number is 567A, and transmits the specification of the ASIC to Adams, which informs the part number is ABC678. The contract manufacturer adds these part numbers to the table Data to Use, which then appears as Table 5—Data to Use.

TABLE 5

Data to Use

| Part Number | Description | Supplier | Supplier Part Number |
|---|---|---|---|
| 456 | 1-kiloohm resistor | Acme | 234 |
| 789 | 1-microfarad capacitor | Acme | 345 |
| 789 | 1-microfarad capacitor | Smith | 467 |
| 567 | PCB | Jones | 567A |
| 678 | ASIC | Adams | ABC678 |

Next, the system addresses the event of supplier change. For instance, suppose the design organization decides New Tech should replace Smith as the supplier of capacitors. To inform the contract manufacturer of this change, the design organization transmit Table 6—New Version, which is received by the contract manufacturer at step 41.

TABLE 6

New Version

| Part Number | Description | Supplier | Supplier Part Number |
|---|---|---|---|
| 456 | 1-kiloohm resistor | Acme | 239 |
| 789 | 1-microfarad capacitor | Acme | 345 |
| 789 | 1-microfarad capacitor | New Tech | 890 |
| 567 | PCB | Jones | |
| 678 | ASIC | Adams | |

In reviewing Table 6—New Version, which is what the design organization possesses and just transmitted to the contract manufacturer, one gleans the design organization's AML is not "up to date." It still has the Acme resistor part numbering error, and the Jones and Adams part numbers are missing, because the contract manufacturer did not notify the design organization of errors and omissions in the design documents to prevent its competitors from free riding on its corrections. In fact, the invention's ability to tolerate "noisy" design documents is a practical advantage and makes it useful for cleaning up design documents while protecting the contract manufacturers' interests.

Referring to FIG. 4, at step 42, the program compares Table 6—New Version to Table 3—Past and detects that New Tech replaced Smith as supplier of the capacitor. Thus, at step 43, the program updates the table Data to Use by replacing Smith and its part number with New Tech and its part number. The program does not, however, detect a change in the resistor part number nor the added Jones and Adams part numbers so that correct data remains unchanged. Table 7 illustrates the table Data to Use after this step 43, which is ready for use in manufacturing. However, if desired, in another feature, the program can validate the New Tech part number at step 44 and sets table Data to Use to the Validated/Corrected New Version at step 47.

TABLE 7

Data to Use

| Part Number | Description | Supplier | Supplier Part Number |
|---|---|---|---|
| 456 | 1-kiloohm resistor | Acme | 234 |
| 789 | 1-microfarad capacitor | Acme | 345 |
| 789 | 1-microfarad capacitor | New Tech | 890 |
| 567 | PCB | Jones | 567A |
| 678 | ASIC | Adams | ABC678 |

The Filter Function

Figure 2B:
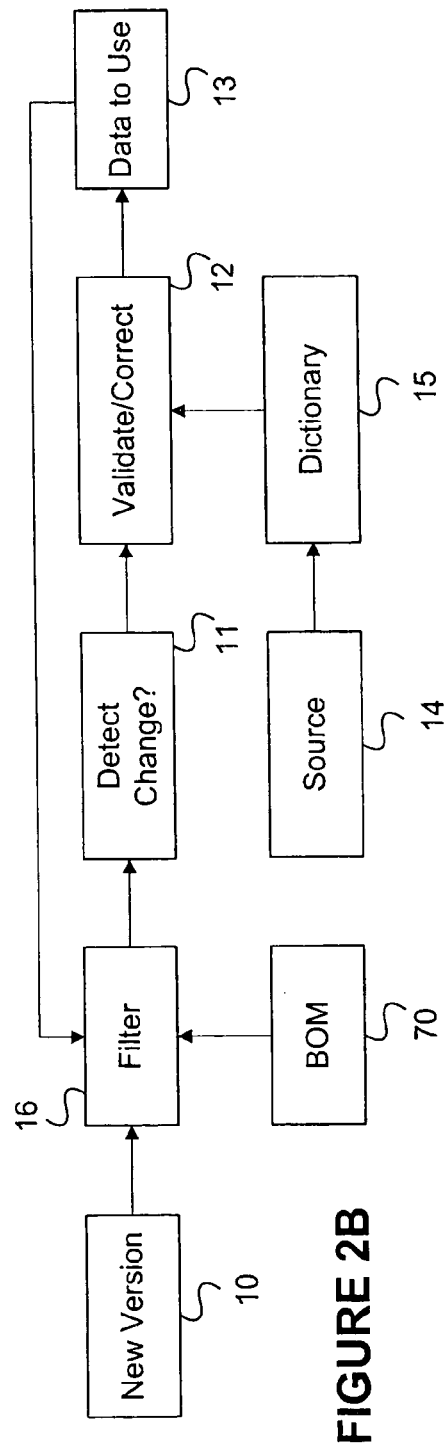
FIG. 2B illustrates the system of FIG. 2A with the addition of a filter function to remove data contained in design documents that is not useful to the contract manufacturer.
Figure 5:
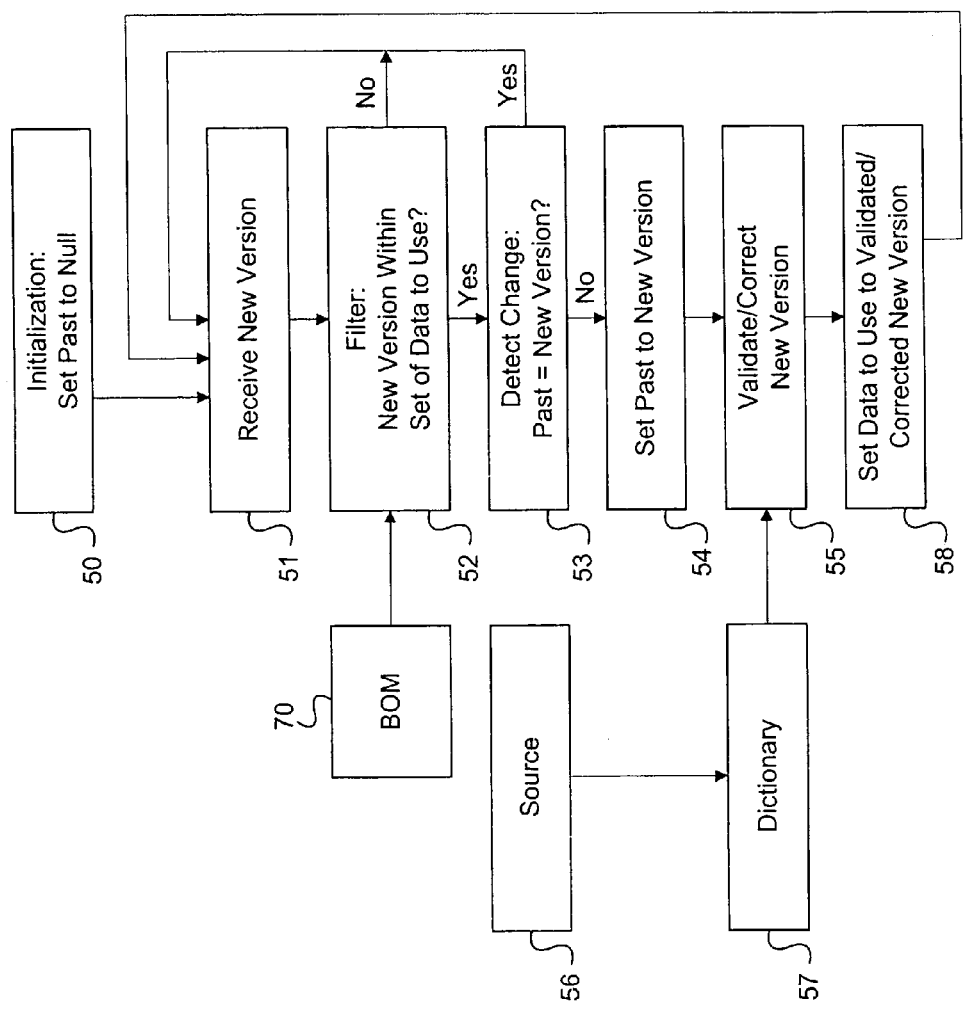
FIG. 5 is a flowchart of the software program depleted in the block diagram of FIG. 2B.

As mentioned earlier, the AML of the design organization may encompass all of its product offerings, which means the AML may list parts, which are irrelevant to the contract manufacturer making a certain product. The invention provides a filter function to exclude the irrelevant data as illustrated in FIG. 2B and FIG. 5. The contract manufacturer can implement this software with Oracle architecture and technologies as before, and again stores two versions of Table 1 in a database. The first version named table Past contains the most recent AML sent by the design organization, and the second version named table Data to Use contains the validated or corrected data for the contract manufacturer to use to make the product.

FIG. 2B shows the filter function in the flow path illustrated in FIG. 2A. As shown, the software, application server and relational database receive and store a new version of the design document 10, filter the new version 16 for relevant information and compare the new version with the past version to detect change 11. If there is no change between the past and the new version, the flow path ends. If there is a change, the software sets the past version to the new version, then validates and corrects data 12 based on a reliable source 14 of a dictionary 15, resulting in data to use 13 to manufacture the product.

At step 50 shown in FIG. 5, the program sets the table Past to null values. At step 51, the contract manufacturer receives the AML sent by the design organization, which includes irrelevant parts not used by the contract manufacturer and for which validating and correcting will not have value. Table 8 illustrates the AML sent by the design organization and received by the contract manufacturer.

TABLE 8

New Version

| Part Number | Description | Supplier | Supplier Part Number |
|---|---|---|---|
| 234 | Nut | Old Tech | 458 |
| 456 | 1-kiloohm resistor | Acme | 239 |
| 789 | 1-microfarad capacitor | Acme | 345 |
| " | 1-microfarad capacitor | New Tech | 890 |
| 235 | Bolt | Old Tech | 459 |
| 567 | PCB | Jones | |
| 678 | ASIC | Adams | |
| 346 | Washer | Mid Tech | 679 |

At step 52, the program retrieves the relevant part numbers, e.g., from the table Data to Use. This step results in Table 9—Filter from Data to Use below:

TABLE 9

Filter from Data to Use
Part number

| |
|---|
| 456 |
| 789 |
| 567 |
| 678 |

At step 52, the program also uses Table 9 to filter Table 8—New Version so that only relevant rows of Table 8—New Version pass to the change detection function. The filter function also detects if a relevant row is missing from Table 8—New Version, because this must be also passed to the change detection function. The result of step 52 is the Table 10—Filtered New Version below.

TABLE 10

Filtered New Version

| Part Number | Description | Supplier | Supplier Part Number |
|---|---|---|---|
| 456 | 1-kiloohm resistor | Acme | 234 |
| 789 | 1-microfarad capacitor | Acme | 345 |
| 789 | 1-microfarad capacitor | New Tech | 890 |
| 567 | PCB | Jones | |
| 678 | ASIC | Adams | |

At step 53, the program operates on Table 10 as before, namely, the change detection function compares Table 10—Filtered New Version to the table Past and detects if there is a change. If there is a change, the program sets the table Past to Table 10—Filtered New Version at step 54. At step 55, the program uses the dictionary 57 from the source 56 to validate and correct Table 10—Filtered New Version. Finally, at step 58, the program sets the table Data to Use to the validated and corrected Table 10.

The Dictionary Change Detection Function

Each part and/or material supplier has a catalog or some other listing of its parts and materials that can be used as the dictionary 15 shown in FIGS. 2A-6 to validate and correct the AML and the BOM. The catalog is typically in paper, CD's, and/or increasingly on web sites in, for example, HTML, XML, and PDF formats. Of course, from time to time, the supplier will introduce new parts, change parts, and discontinue parts. However, the design organization may not be aware of these changes and may not change its own AML to reflect the changes and transmit them to the contract manufacturer.

On other hand, the contract manufacturer can address this information gap by subscribing to the supplier to receive the updates to the catalog or subscribe to a service that provides these updates. Each release of the catalog may have changes from the last release. Some catalogs flag the changes since the last release, but nevertheless require the subscriber to stay current to use these flags and missing one release can make the flags for the next release invalid.

The invention provides for a dictionary change function, implemented in a manner similar to the design document change detection function described earlier where the relational database stores a table Past Dictionary that keeps the values from the previous release of the dictionary.

Figure 3A:
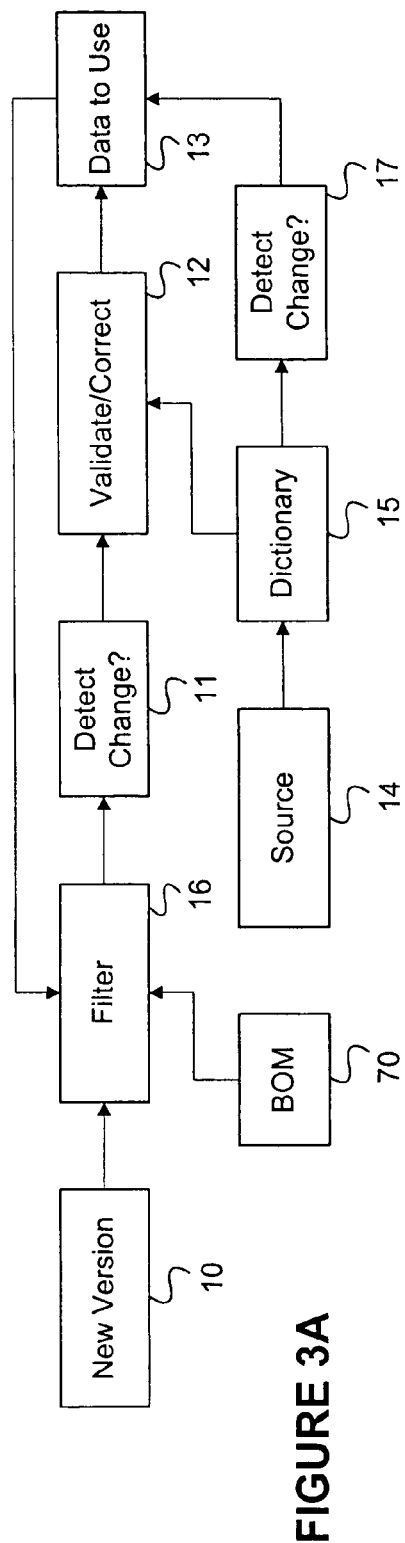
FIG. 3A illustrates the system of FIG. 2B with the addition of a dictionary change function to update the dictionary used to validate and correct the data contained in design documents.

The dictionary change detection function is illustrated in FIG. 3A. To carry out this function, the contract manufacturer stores two versions of the dictionary in a relational database, namely, in a table named Past Dictionary and in a table named Dictionary to Use. As discussed before, the source 14 provides a dictionary 15, for example, Table 12 to validate and correct 12 the AML from the detect change function 11. The contract manufacturer may then receive a release of the catalog, for example, Table 13 that flags changes in the dictionary 15. The program then compares the release of the dictionary with the past dictionary to detect a change 17. If the program detects a change, the program changes the past dictionary 15 such that it becomes the new version of the dictionary used to correct and validate the table Data to Use 13. As a result, the AML stored in the contract manufacturer's database is accurate, up-to-date with the supplier catalogs, and ready to use for manufacturing the product. Table 12 represents the table Past Dictionary for Acme.

TABLE 12

Past Dictionary

| Supplier part number | Description |
|---|---|
| 234 | 1-kiloohm resistor |
| 240 | 2 kiloohm resistor |
| 241 | 3 kiloohm resistor |
| 345 | 1-microfarad capacitor |
| 346 | 2 microfarad capacitor |

To better understand how the dictionary change detection function is implemented suppose Acme changes the part number for the 1-kiloohm resistors. This change could be for many reasons. One reason might be a change in the manufacturing process improves the resistors' tolerance. The change is published in a release of the Acme catalog, and stored in the table New Version represented in Table 13.

TABLE 13

Release of Acme catalog

| Supplier part number | Description |
|---|---|
| 234 | Obsolete on Dec. 1, 2001 |
| 235 | 1-kiloohm resistor replaces part number 234 |
| 240 | 2-kiloohm resistor |
| 241 | 3 kiloohm resistor |
| 345 | 1-microfarad capacitor |
| 346 | 2 microfarad capacitor |

Part numbers 234 and 235 are detected as changes from the table Past Dictionary, thus the part numbers and description are changed as discussed above. The updated dictionary is then used to correct and validate the table Data to Use. Table 14 illustrates the table Data to Use after Dec. 1, 2001:

TABLE 14

Data to Use

| Part Number | Description | Supplier | Supplier Part Number |
|---|---|---|---|
| 456 | 1-kiloohm resistor | Acme | 235 |
| 789 | 1-microfarad capacitor | Acme | 345 |
| 789 | 1-microfarad capacitor | New Tech | 890 |
| 567 | PCB | Jones | 567A |
| 678 | ASIC | Adams | ABC678 |

The Dictionary Filter Function

Figure 3B:
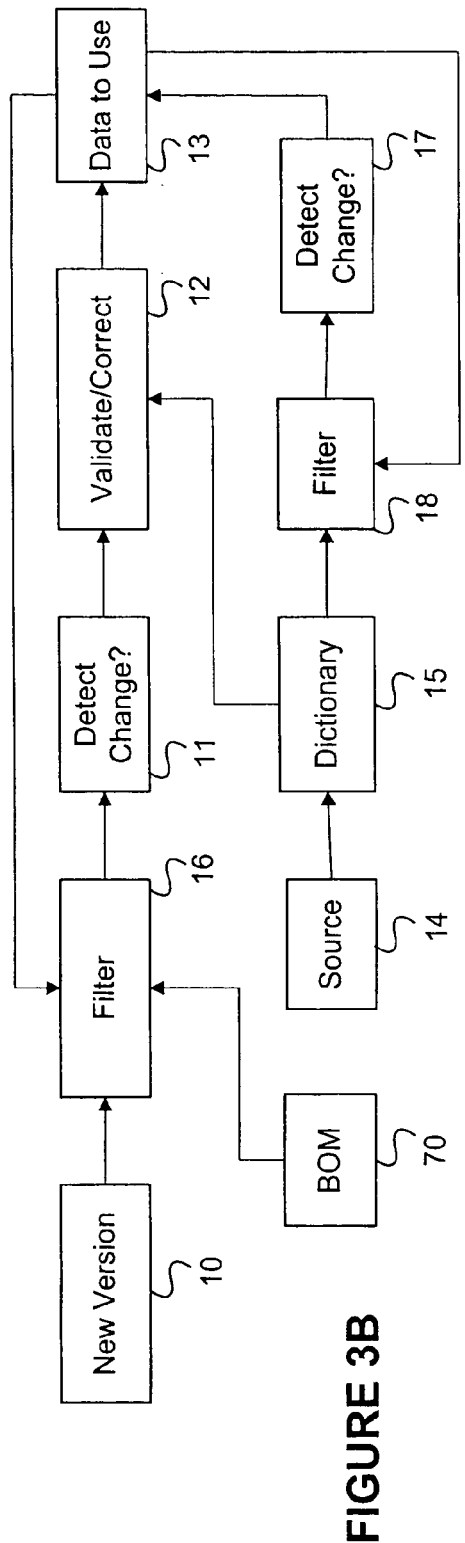
FIG. 3B illustrates the system of FIG. 3A with the addition of a filter function to remove data contained in the dictionary that is not useful to the contract manufacturer.

Supplier catalogs typically list many parts and materials. Thus, many changes in the dictionary are irrelevant to a contract manufacturer making a given product and should be filtered out. Otherwise, the program updates the dictionary based on changes to irrelevant data. FIG. 3B illustrates the system of FIG. 3A with the addition of a filter function to remove irrelevant data contained in the dictionary. As shown, the filter 18 (depicted as Table 15—Part Filter) limits the changes to the dictionary 15 to only those of interest as discussed above in connection with the design document filter. Unlike the document filter, the catalog filter must also detect if a catalog entry is missing. This will cause it detect the change in the Acme 1-kiloohm resistor even if Acme fails to indicate the change to part number 234 to 235 since part number 234 would be missing from the Acme catalog.

TABLE 15

Part Filter

| Supplier | Supplier part number | Description |
|---|---|---|
| Acme | 234 | 1-kiloohm resistor |
| Acme | 345 | 1-microfarad capacitor |
| New Tech | 890 | 1-microfarad capacitor |
| Jones | 567A | PCB |
| Adams | ABC678 | ASIC |

Adding a Part Number to the Filter

To assure that all the required part numbers are available to the filter 16 shown in FIGS. 2A, 2B, 3A, 3B, and 5, the program compares each part number in a BOM 70 with the contents of the part number associated with filter. If a part number in the BOM 70 is not available to the filter 16, the part number is added to the filter 16 and the design organization part number, the associated supplier, and the supplier part numbers are added to the table Past, and the validated and corrected data are added to the table Data to Use. If the part number is not in the unfiltered AML 10, then the program and/or contract manufacturer can request that the part number be transmitted from the design organization.

The Initialization Function

Figure 6:
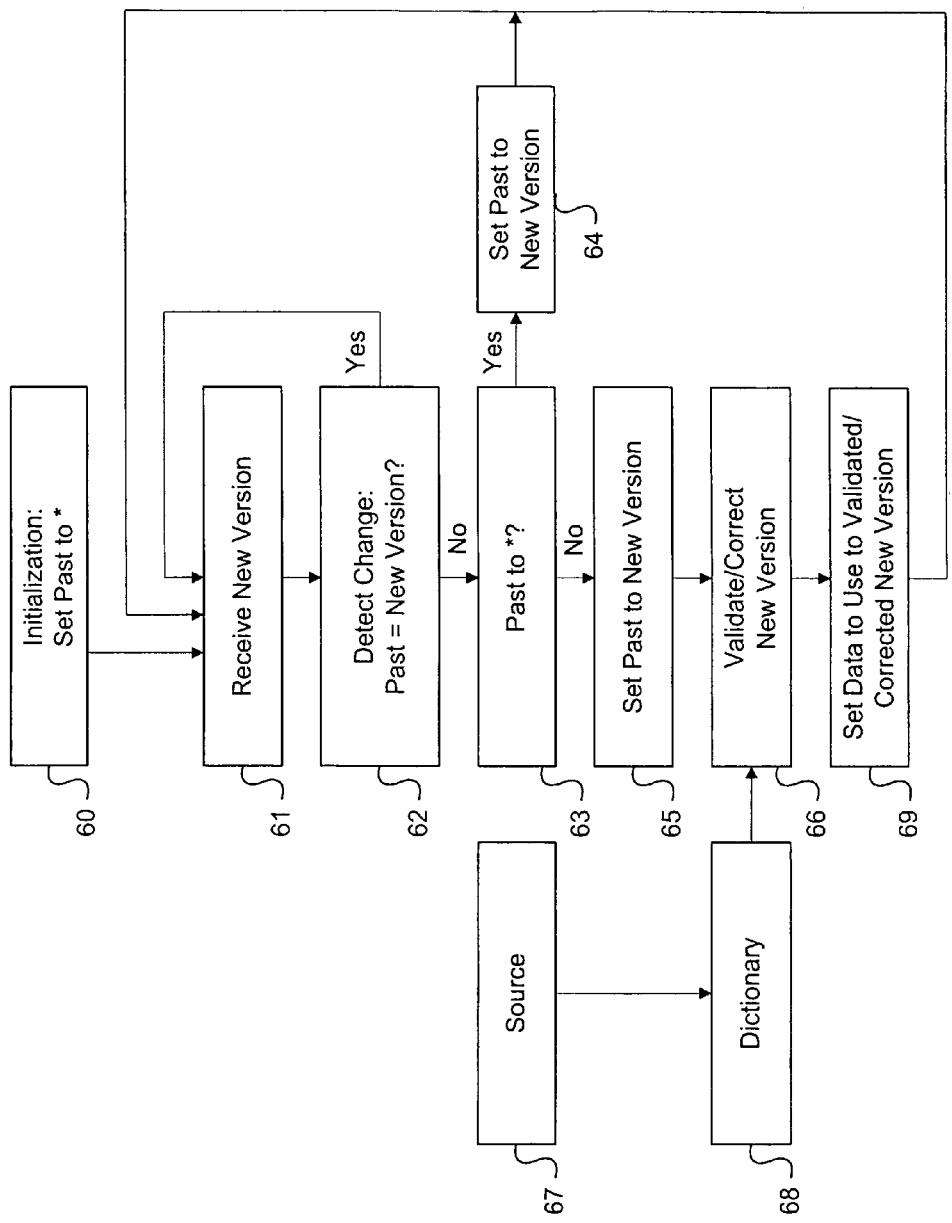
FIG. 6 is a flowchart of the software program depicted in the block diagram of FIG. 4, which permits using the validated data from the table Data to Use to avoid revalidation of data known to be correct.

The contract manufacturer may have validated the table Data to Use and want to use the change detection function in FIGS. 4-6 and the filter function in FIG. 5 without revalidating all of the data. FIG. 6 illustrates this embodiment, where the table Data to Use can initialize the table Past so that the change detection function can be used for subsequent releases of the AML. In the AML, the variable data that are subject to error are the supplier name, the supplier part number, and the part description. Thus, at step 60, the program extracts the part number data from the table Data to Use, and sets each supplier name, supplier part number, and part description to "*", which is a specific value that signals that the current version of the AML provides the data. Table 16 represents the table Data to Use and Table 17 represents the table Past derived from table Data to Use after initialization as discussed.

TABLE 16

Data to Use

| Part Number | Description | Supplier | Supplier Part Number |
| --- | --- | --- | --- |
| 456 | 1-kiloohm resistor | Acme | 234 |
| 789 | 1-microfarad capacitor | Acme | 345 |
| 789 | 1-microfarad capacitor | New Tech | 890 |
| 567 | PCB | Jones | 567A |
| 678 | ASIC | Adams | ABC678 |

TABLE 17

Initialized Past

| Part Number | Description | Supplier | Supplier Part Number |
| --- | --- | --- | --- |
| 456 | * | * | * |
| 789 | * | * | * |
| 789 | * | * | * |
| 567 | * | * | * |
| 678 | * | * | * |

At step 61, the program, application server, and database receive and store Table 18—New Version:

TABLE 18

New Version

| Part Number | Description | Supplier | Supplier Part Number |
| --- | --- | --- | --- |
| 456 | 1-kiloohm resistor | Acme | 239 |
| 789 | 1-microfarad capacitor | Acme | 345 |
| 789 | 1-microfarad capacitor | New Tech | 890 |
| 567 | PCB | Jones | |
| 678 | ASIC | Adams | |

At step 62, the change detection function determines Table 17—Initialized Past does not match Table 18—New Version, and moves to step 63. At step 63, the program detects the data in Table 17—Initialized Past (except the far left column) is set to "*" as discussed earlier so the program moves to step 64. At step 64, the program sets Table 17—Initialized Past to Table 18—New Version, producing Table 19—Past After Processing New Version below.

TABLE 19

Past After Processing New Version

| Part Number | Description | Supplier | Supplier Part Number |
| --- | --- | --- | --- |
| 456 | 1-kiloohm resistor | Acme | 239 |
| 789 | 1-microfarad capacitor | Acme | 345 |
| 789 | 1-microfarad capacitor | New Tech | 890 |
| 567 | PCB | Jones | * |
| 678 | ASIC | Adams | * |

Because incorrect Acme part number 239 is in the table Past After Processing New Version when a matching AML is subsequently received at step 61, the program will not detect change at step 62, and will not therefore invoke the validation and correction of the AML at step 66 using the dictionary 68 from the source 67. This initialization process does not add risk if the program validated the New Version as discussed above. However, the functions are now ready so that the full change detection and filter functions can be used.

Duplicate Use of Part Numbers

Some design organizations use the same part number to designate different parts, which can lead to misunderstandings and errors. However, since the practice exists the contract manufacturer should be able to accommodate it. To understand how, let's assume the design organization instructs the contract manufacturer to make an electronic product 123 using Table 20—BOM and Table 21—AML, and the Table 22—Data to Use is as shown below:

TABLE 20

BOM for Electronic Product 123

| Part Number | Quantity | Description |
| --- | --- | --- |
| 123 | 1 | electronic product |
| 456 | 5 | 1-kiloohm resistor |
| 789 | 3 | 1-microfarad capacitor |
| 567 | 1 | PCB |
| 678 | 1 | ASIC |

TABLE 21

AML for Electronic Product 123

| Part Number | Description | Supplier | Supplier Part Number |
| --- | --- | --- | --- |
| 456 | 1-kiloohm resistor | Acme | 239 |
| 789 | 1-microfarad capacitor | Acme | 345 |
| " | 1-microfarad capacitor | New Tech | 890 |
| 567 | PCB | Jones | |
| 678 | ASIC | Adams | |

TABLE 22

Data to Use for Electronic Product 123

| Part Number | Description | Supplier | Supplier Part Number |
| --- | --- | --- | --- |
| 456 | 1-kiloohm resistor | Acme | 234 |
| 789 | 1-microfarad capacitor | Acme | 345 |
| " | 1-microfarad capacitor | New Tech | 890 |
| 567 | PCB | Jones | 567A |
| 678 | ASIC | Adams | ABC678 |

Now assume the design organization instructs the same contract manufacturer to manufacture a new related electronic product designated part number 124. To do, the design organization sends the following Table 23 and Table 24, the BOM and the AML, respectively, for electronic product 124.

TABLE 23

BOM for Electronic Product 124

| Part Number | Quantity | Description |
|---|---|---|
| 124 | 1 | electronic product |
| 456 | 5 | 1-kiloohm resistor 5% |
| 789 | 3 | 1-microfarad capacitor |
| 568 | 1 | PCB |
| 690 | 1 | ASIC |

TABLE 24

AML for Electronic Product 124

| Part Number | Description | Supplier | Supplier Part Number |
|---|---|---|---|
| 456 | 1-kiloohm resistor 5% | Acme | 434 |
| 789 | 1-microfarad capacitor | Acme | 345 |
| " | 1-microfarad capacitor | New Tech | 890 |
| 568 | PCB | Jones | |
| 690 | ASIC | Adams | |

Comparing the AMLs, in Table 21, the PCB is part number 567, and in Table 24, the PCB is part number 568. The change detection function detects this change in part number, and determines the two sets of tables contain different PCBs. Likewise, the change detection function detects that different ASIC exist in Table 21 and Table 24, and the same capacitor exists in Tables 21 and 24.

Now assume the design organization designates a 1-kiloohm resistor as part number 456 in Table 21—AML for electronic product 123, but reuses part number 456 for a different part, namely, the 1-kiloohm resistor 5% in Table 24—AML for electronic product 124. This may very confusing, however, because the supplier resistor part numbers differ in Tables 21 and 24, the change detection function detects the change. The program and/or contract manufacturer can contact the design organization, which respond, for example, that part number 456 used to make electronic product 123 is really different than part number 456 used in electronic product 124. However, the table Data to Use only permits one mapping of the design organization part number to the supplier and to supplier part number, and a second mapping may make data processing ambiguous if not impossible to implement.

In an embodiment, the program addresses this problem as follows. It changes the design organization part number as shown in Table 25—the BOM, and the corresponding entry in Table 26—the AML, Table 27—Data to Use, and Table 28—New Past. In an embodiment, the program changes the part number by appending a distinguishing symbol to it, such as suffix "% A" to distinguish the duplicate use of the same part number.

TABLE 25

BOM for Electronic Product 124

| Part Number | Quantity | Description |
|---|---|---|
| 124 | 1 | electronic product |
| 456% A | 5 | 1-kiloohm resistor |
| 789 | 3 | 1-microfarad capacitor |
| 568 | 1 | PCB |
| 690 | 1 | ASIC |

TABLE 26

AML for Electronic Product 124

| Part Number | Description | Supplier | Supplier Part Number |
|---|---|---|---|
| 456% A | 1-kiloohm resistor | Acme | 434 |
| 789 | 1-microfarad capacitor | Acme | 345 |
| 789 | 1-microfarad capacitor | New Tech | 890 |
| 567 | PCB | Jones | |
| 678 | ASIC | Adams | |

TABLE 27

Data to Use for Electronic Product 124

| Part Number | Description | Supplier | Supplier Part Number |
|---|---|---|---|
| 456% A | 1-kiloohm resistor | Acme | 234 |
| 789 | 1-microfarad capacitor | Acme | 345 |
| 789 | 1-microfarad capacitor | New Tech | 890 |
| 567 | PCB | Jones | 567A |
| 678 | ASIC | Adams | ABC678 |
| 456 | 1-kiloohm resistor 5% | Acme | 434 |
| 568 | PCB | Jones | |
| 690 | ASIC | Adams | |

TABLE 28

New Past

| Part Number | Description | Supplier | Supplier Part Number |
|---|---|---|---|
| 456% A | 1-kiloohm resistor | Acme | 239 |
| 789 | 1-microfarad capacitor | Acme | 345 |
| " | 1-microfarad capacitor | New Tech | 890 |
| 567 | PCB | Jones | |
| 678 | ASIC | Adams | |
| 568 | PCB | Jones | |
| 690 | ASIC | Adams | |
| 456 | 1-kiloohm resistor 5% | Acme | 434 |

It should be understood from the above, that the repeated part number 456 in Table 28 is different from the repeated entries for part number 789 in that there are two different uses of the part number 456.

What is claimed:

1. A computer-implemented method, comprising:
storing the data of a first version of a design document in a first version table within a memory of a computer associated with a second entity, the first version of the design document being sent from a computer associated with a first entity, the first version of the design document being produced at the computer associated with the first entity before the first version of the design document is sent from the computer associated with the first entity;
storing the data of a second version of the design document in a second version table within the memory of the computer associated with the second entity, the second version of the design document being received from the computer associated with the first entity after first version of the design document was received from the computer associated with the first entity; and
comparing the data of the second version table with the data of the first version table to detect a change in the data between the first version of the design document and the second version of the design document,
if a change in the data is detected, setting the first version table to the second version table;

using, at the computer associated with the second entity, a dictionary with correct data for the design document to correct and validate the data of the second version table to produce a corrected and validated internal version table; and storing the corrected and validated internal version table within the memory of the computer associated with the second entity such that the memory of the computer associated with the second entity includes the corrected and validated internal version table and the first version table at a given time.

2. The method of claim 1, further comprising initializing the first version table and the second version table by setting the data contained to null values.

3. The method of claim 1, wherein the first version table and the second version table is a bill of materials listing a plurality of produce parts or an approved manufacturing list listing a plurality of part suppliers.

4. The method of claim 1, further comprising the step of filtering the data of the second version table before comparing the data of the second version table with the data of the first version table.

5. The method of claim 4, further comprising the step of adding new data for filtering the second version table.

6. The method of claim 1, further comprising updating the dictionary with a new release before the dictionary is used to correct and validate the data of the second version table.

7. The method of claim 6, further comprising the step of filtering the new release before updating the dictionary with the new release.

8. The method of claim 7, further comprising the step of adding data to the new release before filtering the new release of the dictionary.

9. The method of claim 8, further comprising the step of using new data to filter the new release before updating the dictionary with the new release.

10. A processor-readable medium storing code representing instructions that when executed by a processor cause the processor to perform a process, the code comprising code to:
store a past version of a design document sent from a computer associated with a first entity within a memory of a computer associated with a second entity;
store a new version of the design document sent from the computer associated with the first entity, the new version of the design document being sent from the computer associated with the first entity after the past version of the design document was sent;
store a dictionary within the memory of the computer associated with the second entity, contents of the dictionary being accessible to the second entity and not accessible to the first entity; and
set the past version of the design document to the new version of the design document when the new version of the design document and the past version of the design document differ, and
after the past version of the design document is set to the new version of the design document, correct, at the computer associated with the second entity, the data that has changed between the past version of the design document and new version of the design document using the dictionary to produce a new design document with data-to-use, the new version of the design document with data-to-use being accessible to the second entity and not accessible to the first entity.

11. The processor-readable medium of claim 10, wherein the past version of the design document, the new version of the design document, and the new design document with data-to-use is a bill of materials or an approved manufacturing list.

12. The processor-readable medium of claim 10, further comprising code to:
filter the new version of the design document for relevant information.

13. The processor-readable medium of claim 12, further comprising code to:
add new data before the new version of the design document is filtered.

14. The processor-readable medium of claim 10, further comprising code to:
update the dictionary with a new release of the dictionary before the data for the new design document is corrected using the dictionary to produce the new design document with data-to-use.

15. The processor-readable medium of claim 14, further comprising code to:
filter the new release of the dictionary before the dictionary is updated with the new release of the dictionary.

16. The processor-readable medium of claim 15, further comprising code to:
add data to the new release of the dictionary before the new release of the dictionary is filtered.

17. The processor-readable medium of claim 10, further comprising code to:
initialize all of the data in the past version of the design document to indicate that the new version of the design document contains the data to be corrected.

18. The processor-readable medium of claim 10, further comprising code to:
store the new design document with data-to-use in tables in a relational database,
the code to store the past version of the design document includes code to store the past version of the design document in tables in the relational database,
the code to store the new version of the design document includes code to store the new version of the design document in tables in the relational database.

19. A system, comprising:
a database including a new document table with data sent from a computer associated with a first entity to a computer associated with a second entity, a previous document table with data of a design document sent from the computer associated with the first entity to the computer associated with the second entity, the design document being sent from the computer associated with the first entity before the data of the new document table, and an internal document table with validated data of the design document, at least a portion of the database being stored within a memory of the computer associated with the second entity;
the computer associated with the second entity programmed to access the database and as follows:
identify data of the new document table that has changed from the data of the previous document table;
compare the validated data of the internal document table with the changed data of the new document table; and
replace the changed data of the new document table with the validated data of the internal document table, the validated data being accessible to the second entity and not being accessible to the first entity.

20. The system of claim 19, wherein the design document is a bill of materials or an approved manufacturing list.

21. The system of claim 19, wherein the database includes a data-to-use table with the validated data for manufacturing according to the design document.

22. The system of claim 19, wherein the computer is further programmed to filter irrelevant data from the design document.

23. The method of claim 1, wherein the corrected and validated internal version table is accessible to the second entity and not accessible to the first entity.

24. The method of claim 1, wherein the dictionary is accessible to the second entity and not accessible to the first entity.

* * * * *